United States Patent
Trip et al.

(10) Patent No.: US 10,715,984 B2
(45) Date of Patent: Jul. 14, 2020

(54) CONNECTION SWITCHING FOR BLUETOOTH HEADSETS

(71) Applicant: Plantronics, Inc., Santa Cruz, CA (US)

(72) Inventors: Bart Trip, Emmen (NL); Rik Koops, Gieten (NL); Eddie Klaassens, Emmen (NL); Kem Gallione, Santa Cruz, CA (US); John B Ledingham, Scotts Valley, CA (US); Dick de Jong, Emmen (NL)

(73) Assignee: Plantronics, Inc., Santa Cruz, CA (US)

( * ) Notice: Subject to any disclaimer, the term of this patent is extended or adjusted under 35 U.S.C. 154(b) by 115 days.

(21) Appl. No.: 15/891,039

(22) Filed: Feb. 7, 2018

(65) Prior Publication Data

US 2018/0167793 A1 Jun. 14, 2018

Related U.S. Application Data

(62) Division of application No. 15/255,702, filed on Sep. 2, 2016, now Pat. No. 9,986,370.

(60) Provisional application No. 62/318,697, filed on Apr. 5, 2016.

(51) Int. Cl.
*H04W 4/80* (2018.01)
*H04W 8/00* (2009.01)
(52) U.S. Cl.
CPC .............. *H04W 4/80* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 9,301,087 B1 * | 3/2016 | Pappas | H04W 4/008 |
| 2008/0261524 A1 * | 10/2008 | Grushkevich | H04M 1/72513 455/41.2 |
| 2009/0163141 A1 | 6/2009 | Chae | |
| 2013/0072119 A1 * | 3/2013 | Park | H04W 8/005 455/41.2 |
| 2015/0312703 A1 * | 10/2015 | Maldari | H04W 8/005 455/41.2 |
| 2018/0167792 A1 | 6/2018 | Trip et al. | |

* cited by examiner

*Primary Examiner* — Jianxun Yang
(74) *Attorney, Agent, or Firm* — Jeremy S. DesRosier

(57) ABSTRACT

Connection switching for Bluetooth headsets is disclosed. A Bluetooth headset includes a Bluetooth transceiver configured to receive a message from a first Bluetooth device over a first Bluetooth connection with the first Bluetooth device. The message includes a command to establish a second Bluetooth connection with a second Bluetooth device. The Bluetooth headset also includes a processor configured to cause the Bluetooth transceiver to (i) release the first Bluetooth connection and then (ii) establish the second Bluetooth connection with the second Bluetooth device responsive to the Bluetooth transceiver receiving the message. Computer-readable media for the Bluetooth devices is also disclosed.

6 Claims, 8 Drawing Sheets

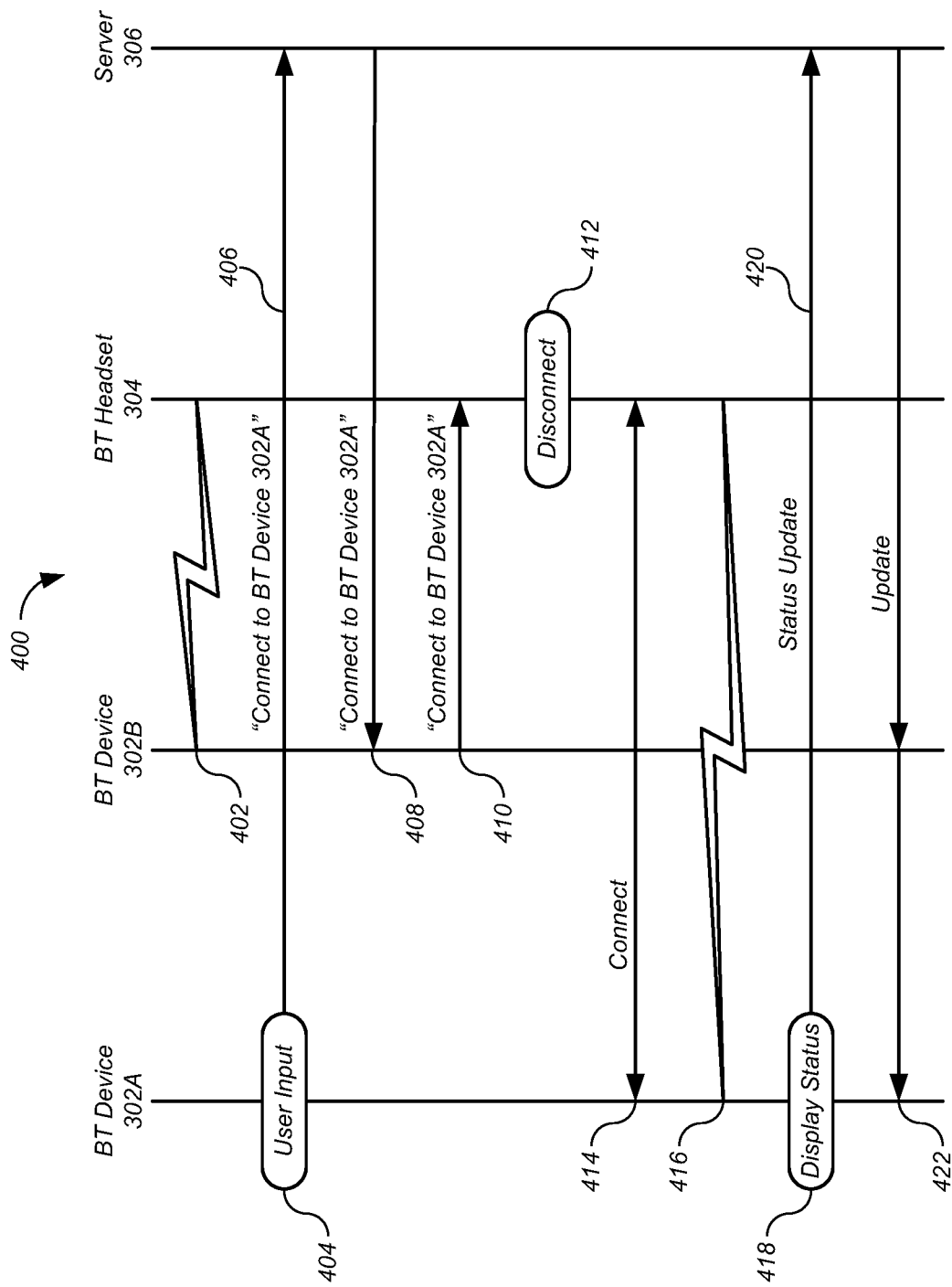

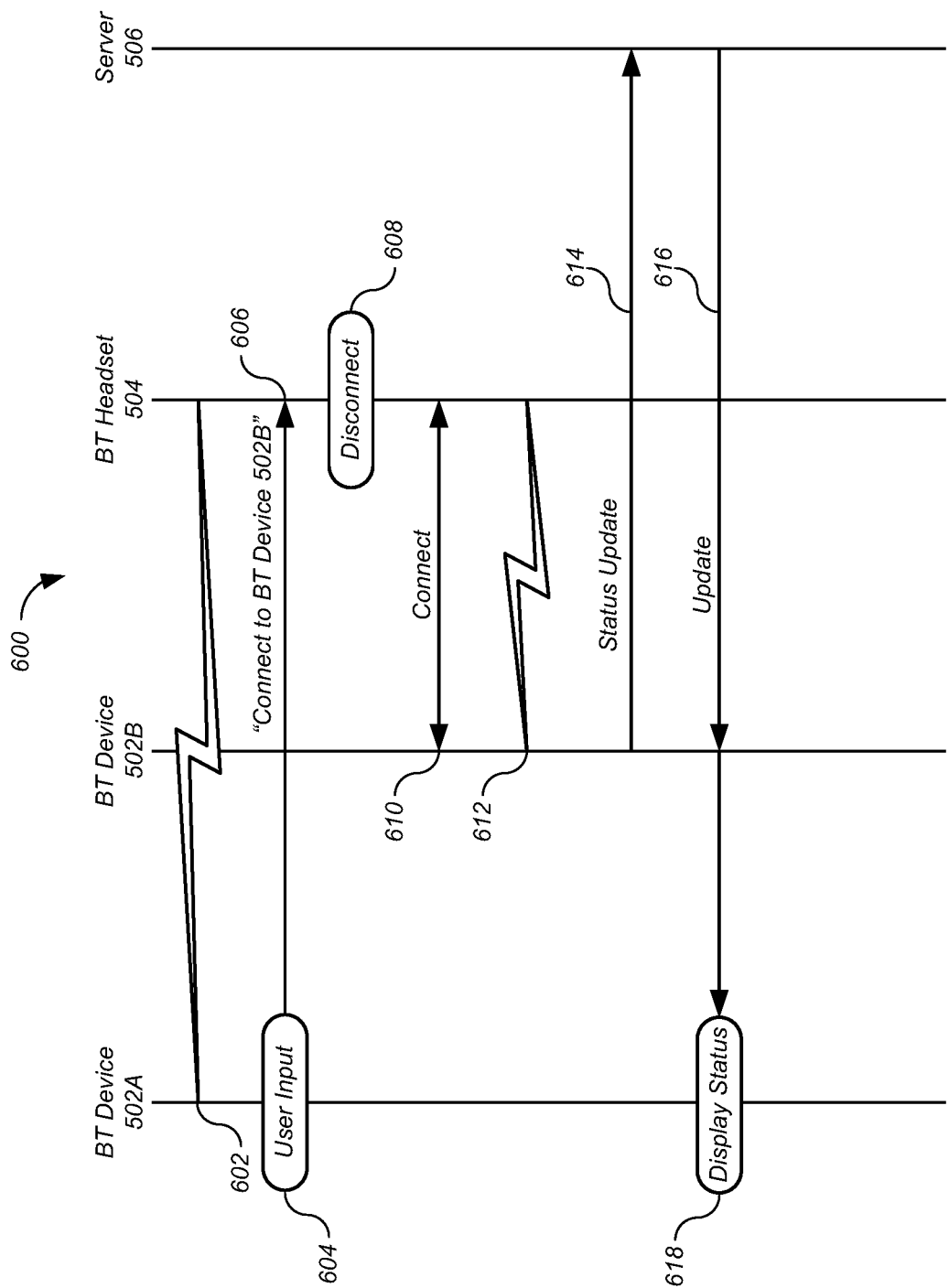

CONNECTION SWITCHING FOR BLUETOOTH HEADSETS

CROSS-REFERENCE TO RELATED APPLICATIONS

This application is a divisional of U.S. patent application Ser. No. 15/255,702 entitled "CONNECTION SWITCHING FOR BLUETOOTH HEADSETS," filed Sep. 2, 2016, which claims the benefit of U.S. Provisional Patent Application Ser. No. 62/318,697 entitled "Switching the Device, to which a Bluetooth Headset is Connected, Using a Mobile App," filed Apr. 5, 2016, the disclosures of which are incorporated herein as though set forth in full.

FIELD

The present disclosure relates generally to the field of Bluetooth connections. More particularly, the present disclosure relates to switching Bluetooth connections among Bluetooth devices.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Bluetooth has become an indispensable protocol for connecting devices wirelessly over short distances. Bluetooth has become especially popular for connection wireless headsets to devices such as smartphones, music players, and the like. A headset user may have several such Bluetooth devices. One problem that arises for such a user is changing the device to which the headset is connected.

The current solution is for the user to find and operate the device to which the Bluetooth headset is currently connection to release the connection, and then to operate the device to which a Bluetooth connection is desired. This procedure is cumbersome and inconvenient, especially in cases where the currently-connected device is in another room or cannot be found.

SUMMARY

In general, in one aspect, an embodiment features a Bluetooth headset comprising: a Bluetooth transceiver configured to receive a message from a first Bluetooth device over a first Bluetooth connection with the first Bluetooth device, wherein the message includes a command to establish a second Bluetooth connection with a second Bluetooth device; and a processor configured to cause the Bluetooth transceiver to (i) release the first Bluetooth connection and then (ii) establish the second Bluetooth connection with the second Bluetooth device responsive to the Bluetooth transceiver receiving the message.

Embodiments of the Bluetooth headset may include one or more of the following features. The message includes the Bluetooth Device Address of the second Bluetooth device.

In general, in one aspect, an embodiment features computer-readable media embodying instructions executable by a processor in a Bluetooth headset to perform functions comprising: receiving a message from a first Bluetooth device over a first Bluetooth connection with the first Bluetooth device, wherein the message includes a command to establish a second Bluetooth connection with a second Bluetooth device; and causing a Bluetooth transceiver of the Bluetooth headset to (i) release the first Bluetooth connection and then (ii) establish the second Bluetooth connection with the second Bluetooth device responsive to the Bluetooth transceiver receiving the message.

Embodiments of the computer-readable media may include one or more of the following features. In some embodiments, the message includes the Bluetooth Device Address of the second Bluetooth device.

In general, in one aspect, an embodiment features computer-readable media embodying instructions executable by a processor in a first Bluetooth device to perform functions comprising: indicating, upon a user interface of the first Bluetooth device, a connection status of the first Bluetooth device, a second Bluetooth device, and a Bluetooth headset, wherein the connection status indicates that (i) the second Bluetooth device has a first Bluetooth connection with the Bluetooth headset and (ii) the first Bluetooth device has no Bluetooth connection with the Bluetooth headset; receiving, from the user interface of the first Bluetooth device, a user input to establish a second Bluetooth connection between the Bluetooth headset and the first Bluetooth device; and sending a message from the first Bluetooth device to the second Bluetooth device responsive to receiving the user input, wherein the message represents a command for the Bluetooth headset to establish the second Bluetooth connection with the first Bluetooth device; wherein the second Bluetooth device sends the message to the Bluetooth headset; and wherein the Bluetooth headset, responsive to receiving the message, (i) releases the first Bluetooth connection with the second Bluetooth device and then (ii) establishes the second Bluetooth connection with the first Bluetooth device.

Embodiments of the computer-readable media may include one or more of the following features. In some embodiments, sending the message to the second Bluetooth device comprises: sending the message to a server, wherein the server sends the message to the second Bluetooth device. In some embodiments, the functions further comprise: sending a status message responsive to the Bluetooth headset establishing the second Bluetooth connection with the first Bluetooth device, wherein the status message indicates that the first Bluetooth device has the second Bluetooth connection with the Bluetooth headset. In some embodiments, the functions further comprise: updating the user interface of the first Bluetooth device to indicate that (i) the first Bluetooth device has the second Bluetooth connection with the Bluetooth headset and (ii) the second Bluetooth device has not Bluetooth connection with the Bluetooth headset responsive to being connected to the Bluetooth headset. In some embodiments, the message includes the Bluetooth Device Address of the second Bluetooth device.

In general, in one aspect, an embodiment features computer-readable media embodying instructions executable by a processor in a first Bluetooth device to perform functions comprising: indicating, upon a user interface of the first Bluetooth device, a connection status of the first Bluetooth device, a second Bluetooth device, and a Bluetooth headset, wherein the connection status indicates that (i) the first Bluetooth device has a first Bluetooth connection with the Bluetooth headset and (ii) the second Bluetooth device has no Bluetooth connection with the Bluetooth headset; receiving, from the user interface of the first Bluetooth device, a user input to establish a second Bluetooth connection between the second Bluetooth device and the Bluetooth headset; and sending a message from the first Bluetooth device to the Bluetooth headset responsive to receiving the user input, wherein the message represents a command for the Bluetooth headset to establish the second Bluetooth connection with the second Bluetooth device; wherein the Bluetooth headset, responsive to receiving the message, (i) releases the first Bluetooth connection with the first Bluetooth device and then (ii) establishes the second Bluetooth connection with the second Bluetooth device.

Embodiments of the computer-readable media may include one or more of the following features. In some embodiments, the functions further comprise: receiving a status message, wherein the status message indicates that the second Bluetooth device has the second Bluetooth connection with the Bluetooth headset. In some embodiments, the functions further comprise: updating the user interface of the first Bluetooth device to indicate that (i) the first Bluetooth device has no Bluetooth connection with the Bluetooth headset and (ii) the second Bluetooth device has the second Bluetooth connection with the Bluetooth headset responsive to receiving the status message. In some embodiments, the message includes the Bluetooth Device Address of the second Bluetooth device.

In general, in one aspect, an embodiment features computer-readable media embodying instructions executable by a processor in a first Bluetooth device to perform functions comprising: indicating, upon a user interface of the first Bluetooth device, a connection status of the first Bluetooth device, a second Bluetooth device, a third Bluetooth device, and a Bluetooth headset, wherein the connection status indicates that (i) the first Bluetooth device has no Bluetooth connection with the Bluetooth headset, (ii) the second Bluetooth device has a first Bluetooth connection with the Bluetooth headset, and (iii) the third Bluetooth device has no Bluetooth connection with the Bluetooth headset; receiving, from the user interface of the first Bluetooth device, a user input to establish a second Bluetooth connection between the third Bluetooth device and the Bluetooth headset; and sending a message from the first Bluetooth device to the second Bluetooth device responsive to receiving the user input, wherein the message represents a command for the Bluetooth headset to establish the second connection with the third Bluetooth device; wherein the second Bluetooth device sends the message to the Bluetooth headset; and wherein the Bluetooth headset, responsive to receiving the message, (i) releases the first Bluetooth connection with the second Bluetooth device and then (ii) establishes the second Bluetooth connection with the third Bluetooth device.

Embodiments of the apparatus may include one or more of the following features. In some embodiments, sending the message to the second Bluetooth device comprises: sending the message to a server, wherein the server sends the message to the second Bluetooth device. In some embodiments, the functions further comprise: receiving a status message responsive to the third Bluetooth device having the second Bluetooth connection with the Bluetooth headset, wherein the status message indicates that the third Bluetooth device has the second Bluetooth connection with the Bluetooth headset. In some embodiments, the functions further comprise: updating a user interface of the first Bluetooth device to indicate that (i) the first Bluetooth device has no Bluetooth connection with the Bluetooth headset, (ii) the second Bluetooth device has no Bluetooth connection with the Bluetooth headset and (iii) the third Bluetooth device has the second Bluetooth connection with the Bluetooth headset responsive to receiving the status message. In some embodiments, the message includes the Bluetooth Device Address of the third Bluetooth device.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

In one embodiment a user of a Bluetooth device may "pull" a Bluetooth headset connection from a second Bluetooth device.

Figure 3B:
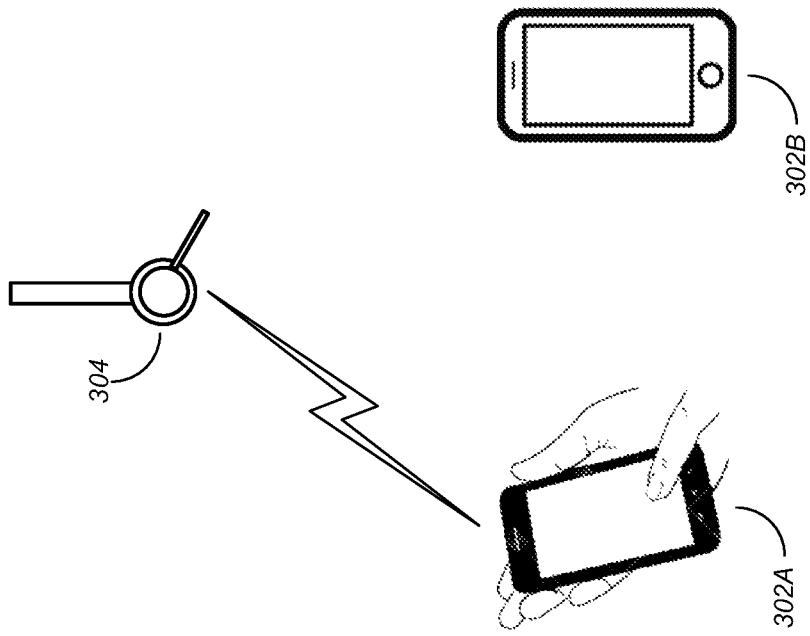
Figure 3A:
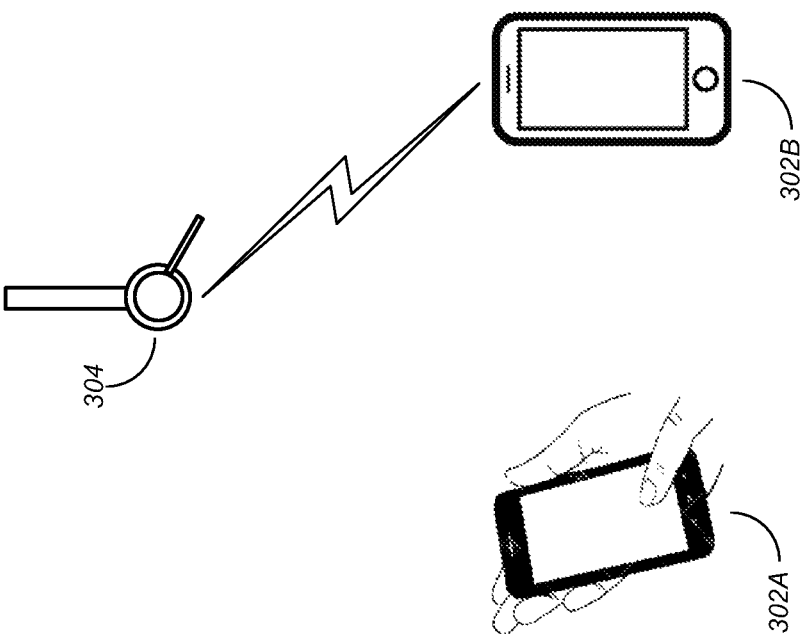

FIGS. 3A and 3B illustrate this embodiment.

FIG. 4 is a flow diagram illustrating this process.

In one embodiment a user of a Bluetooth device may "push" a Bluetooth headset connection to a second Bluetooth device.

Figure 5B:
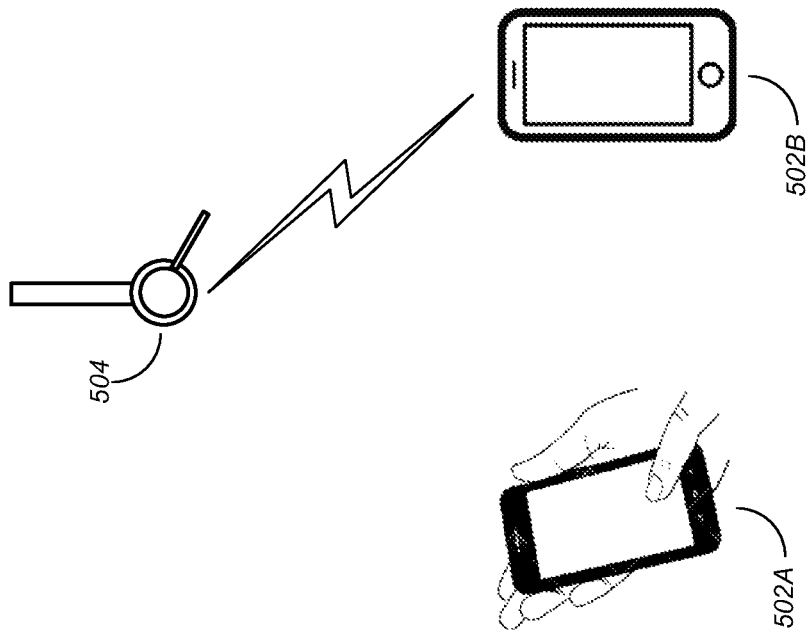
Figure 5A:
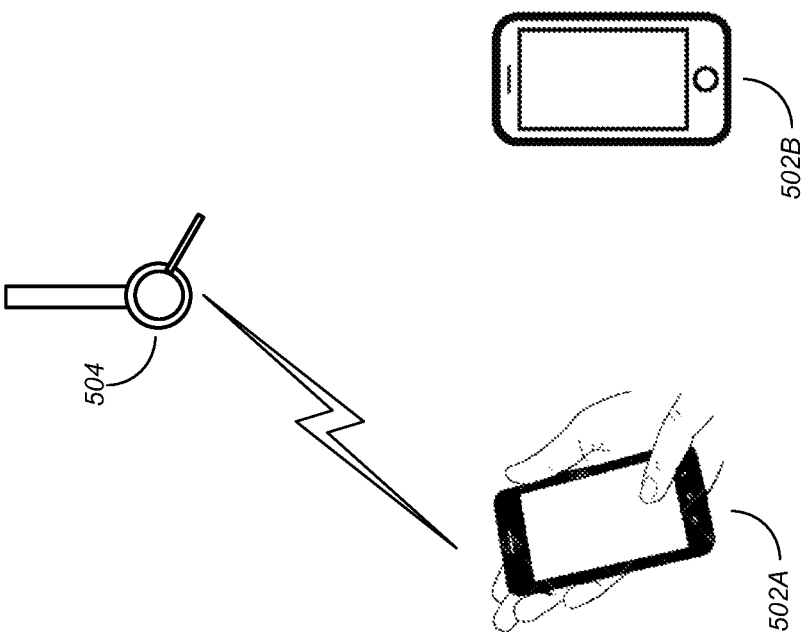

FIGS. 5A and 5B illustrate this embodiment.

FIG. 6 is a flow diagram illustrating this process.

In one embodiment a user of a Bluetooth device may "transfer" a Bluetooth headset connection from a second Bluetooth device to a third Bluetooth device.

Figure 7B:
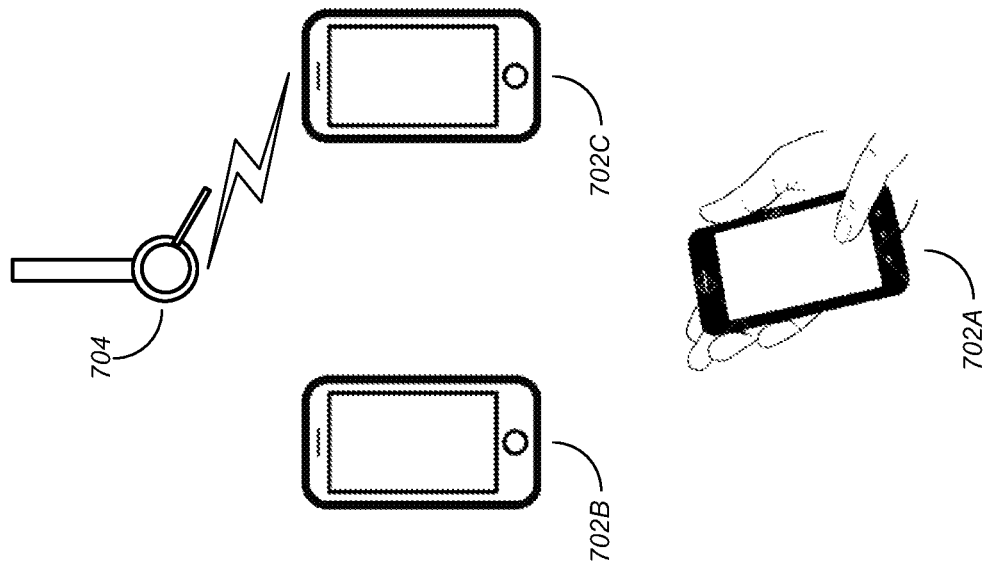
Figure 7A:
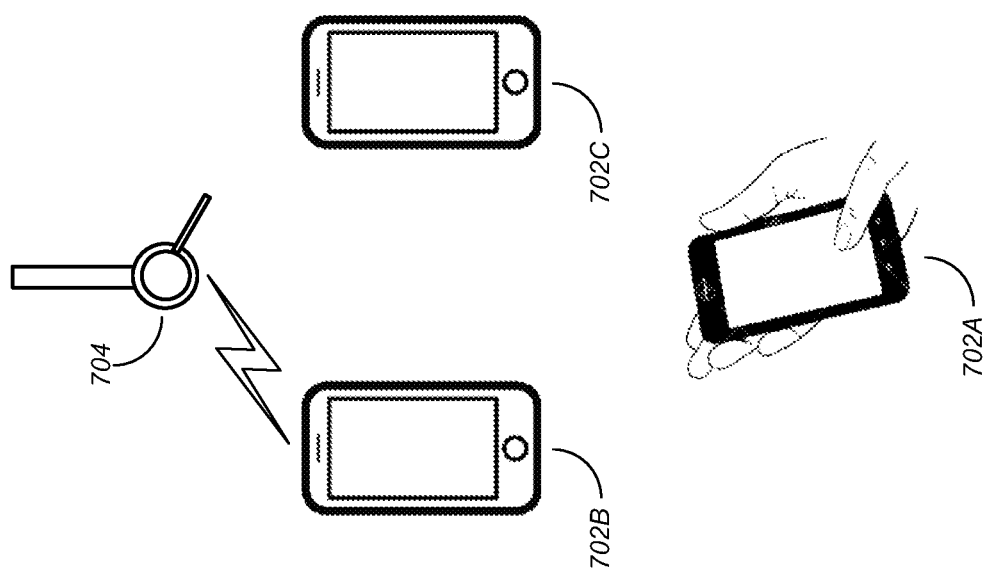

FIGS. 7A and 7B illustrate this embodiment.

Figure 8:
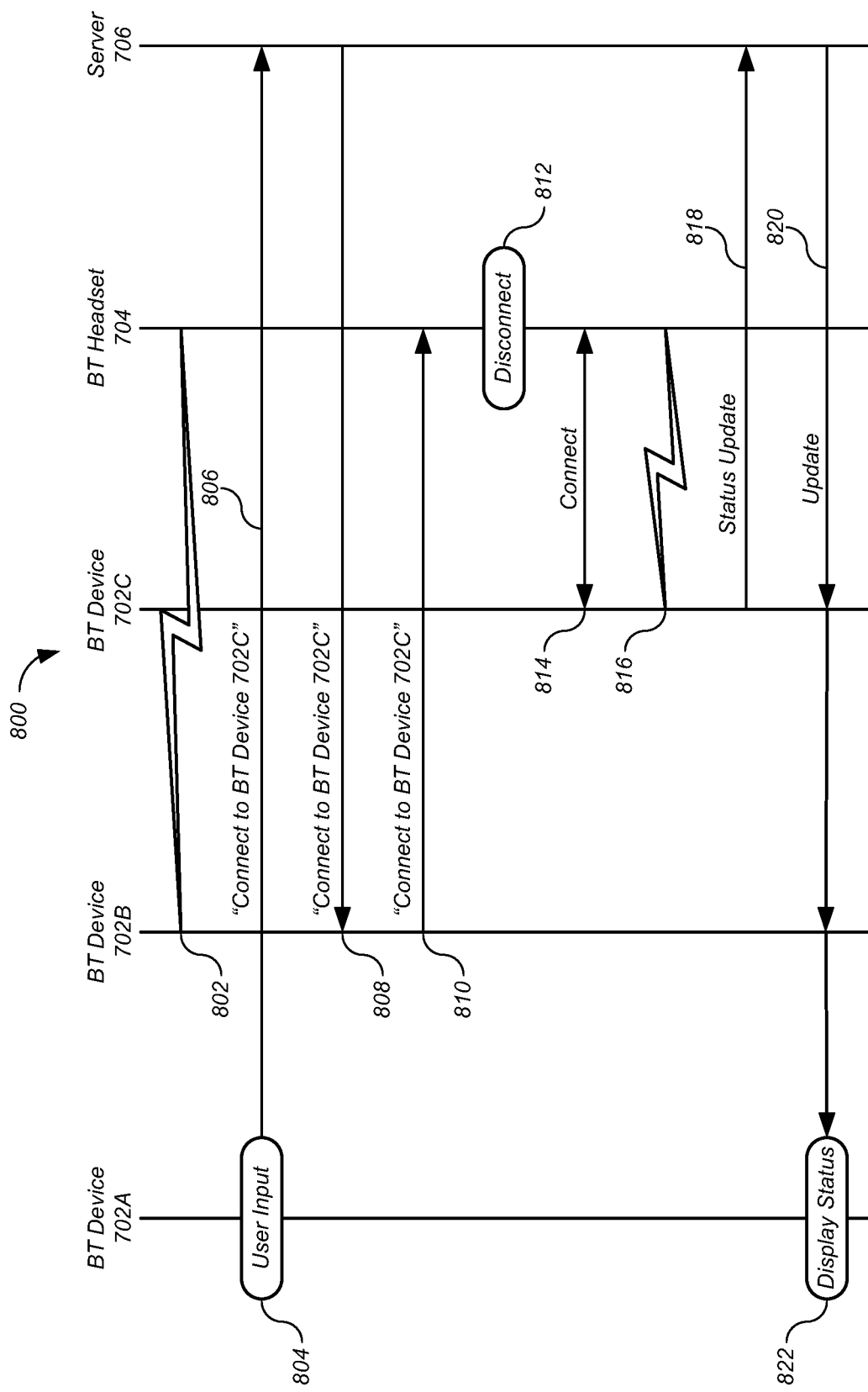

FIG. 8 is a flow diagram illustrating this process.

DETAILED DESCRIPTION

Embodiments of the present disclosure provide connection switching for Bluetooth headsets. A user of a Bluetooth device such as a smartphone or the like may use that Bluetooth device to cause a Bluetooth headset to connect to that Bluetooth device or to another Bluetooth device, even if the user's Bluetooth device has no Bluetooth connection to the Bluetooth headset. A user of a Bluetooth device that is connected to a Bluetooth headset may use that Bluetooth device to cause the Bluetooth headset to disconnect from the user's Bluetooth device and then connect to another Bluetooth device that is specified by the user. A user of a Bluetooth device that is not connected to a Bluetooth headset may use that Bluetooth device to cause the Bluetooth headset to release its current connection and connect to the user's Bluetooth device. A user of a Bluetooth device that is not connected to a Bluetooth headset may use that Bluetooth device to cause the Bluetooth headset to release its current connection and connect to another Bluetooth device that is specified by the user. Other features are contemplated as well.

Figure 1:
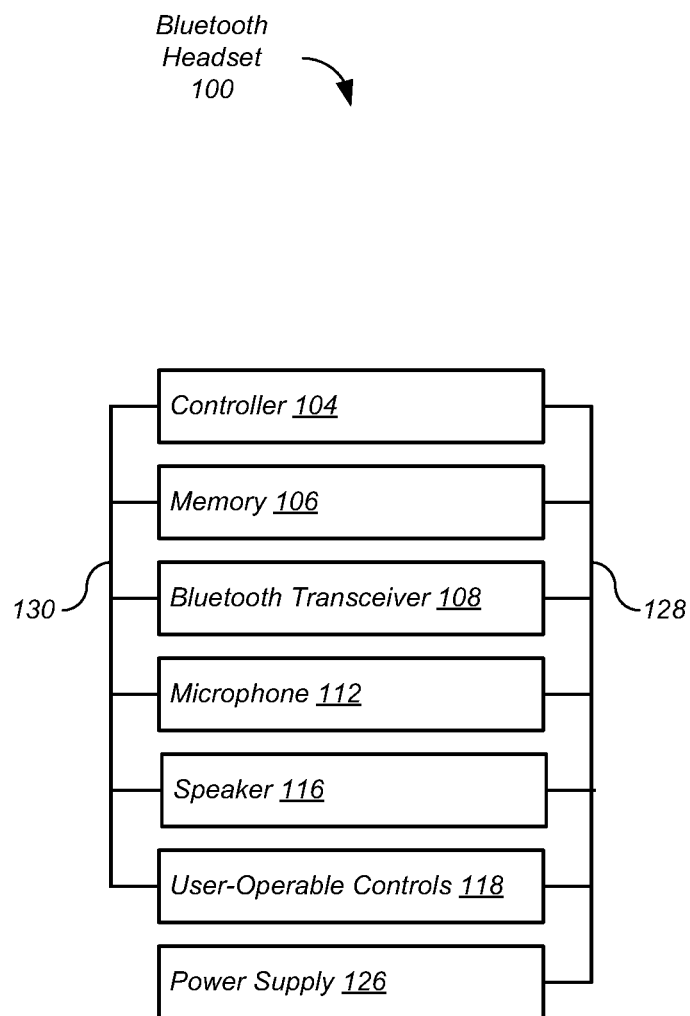
FIG. 1 shows elements of a Bluetooth headset according to one embodiment.

FIG. 1 shows elements of a Bluetooth headset 100 according to one embodiment. Although in the described embodiment elements of the Bluetooth headset 100 are presented in one arrangement, other embodiments may feature other arrangements. For example, various embodiments may lack one or more of the features shown. In addition, elements of the Bluetooth headset 100 may be implemented in hardware, software, or combinations thereof.

Referring to FIG. 1, the Bluetooth headset 100 may include one or more each of a controller 104, a memory 106, a Bluetooth transceiver 108, a microphone 112, a speaker 116, one or more user-operable controls 118, and a power supply 126. The Bluetooth headset 100 may include other elements as well. The elements of the Bluetooth headset 100 may receive power from the power supply 126 over one or more power rails 128. Various elements of the Bluetooth headset 100 may be implemented as one or more integrated circuits.

The controller 104 may execute applications stored in the memory 106. The controller 104 may include digital signal processors, analog-to-digital converters, digital-to-analog converters, and the like. The controller 104 may communicate with other elements of the Bluetooth headset 100 over one or more communication busses 130.

Figure 2:
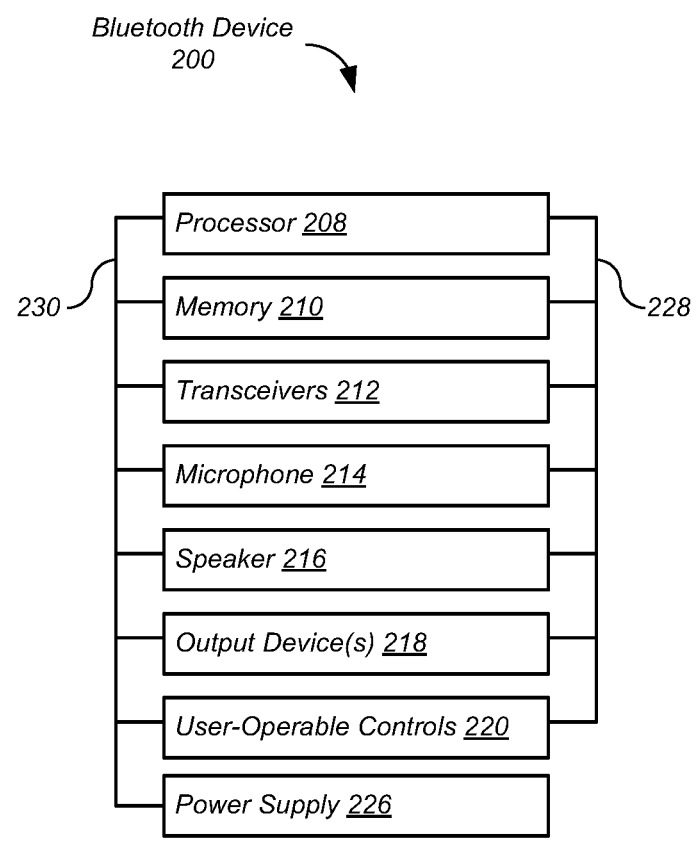
FIG. 2 shows elements of a Bluetooth device according to one embodiment.

FIG. 2 shows elements of a Bluetooth device 200 according to one embodiment. The Bluetooth device 200 may be implemented as a smartphone, a tablet, a smartwatch, a music player, a personal computer, or the like. Although in the described embodiment elements of the Bluetooth device 200 are presented in one arrangement, other embodiments may feature other arrangements. For example, elements of the Bluetooth device 200 may be implemented in hardware, software, or combinations thereof.

Referring to FIG. 2, the Bluetooth device 200 may include one or more of a processor 208, a memory 210, transceivers 212, a microphone 214, a speaker 216, one or more output devices 218, one or more user-operable controls 220, and a power supply 226. The elements of the Bluetooth device 200 may receive power from the power supply 226 over one or more power rails 230. Various elements of the Bluetooth device 200 may be implemented as one or more integrated circuits. The Bluetooth device 200 may include other elements as well.

The processor 208 may execute applications stored in the memory 210. The processor 208 may include digital signal processors, analog-to-digital converters, digital-to-analog converters, and the like. The processor 208 may communicate with other elements of the Bluetooth device 200 over one or more communication busses 228. The output devices 218 may include displays, speakers, haptic devices, and the like. The displays may be implemented as touch screens or the like. The user-operable controls 220 may include buttons, slide switches, capacitive sensors, touch screens, and the like. The transceivers 212 may include a Bluetooth transceiver, a Wi-Fi transceiver, and the like.

In one embodiment a user of a Bluetooth device may "pull" a Bluetooth headset connection from a second Bluetooth device. FIGS. 3A and 3B illustrate this embodiment. Referring to FIG. 3A, a user of a Bluetooth device 302A would like to connect that Bluetooth device 302A to a Bluetooth headset 304 that is connected to a second Bluetooth device 302B. At the end of the process, the Bluetooth headset 304 is connected to the user's Bluetooth device 302A and is not connected to the second Bluetooth device 302B, as shown in FIG. 3B. The Bluetooth devices 302 and Bluetooth headset 304 may be implemented as shown in, and described with reference to, FIGS. 1 and 2. FIG. 4 is a flow diagram illustrating this process 400.

Referring to FIG. 4, at the start of the process 400, the Bluetooth headset 304 has no Bluetooth connection with the user's Bluetooth device 302A but has a Bluetooth connection with the second Bluetooth device 302B, at 402. The user's Bluetooth device 302A may indicate this status. For example, the status may be kept by a server 306, and may be updated by the Bluetooth devices 302.

The user may initiate the connection pull process by providing user input to the user's Bluetooth device 302A, at 404. For example, the user may employ an app executed by the user's Bluetooth device 302A that implements the functionality described herein. In one embodiment the user drags an icon representing the Bluetooth headset 304 away from an icon representing the second Bluetooth device 302B and toward an icon representing the user's Bluetooth device 302A. Alternatively, the process may be initiated automatically based on user settings, system states such as whether the headset 304 is in a call, and the like.

Responsive to the user input, the user's Bluetooth device 302A may send a message to the server 306, at 406. The message may represent a command for the Bluetooth headset 304 to establish a Bluetooth connection with the user's Bluetooth device 302A. The message may include the Bluetooth Device Address of the user's Bluetooth device 302A or some other unique device identification tag or number. The server 306 may send the message to the second Bluetooth device 302B, at 408. Communications between the Bluetooth devices 302 and the server 306 may be by network connections such as Wi-Fi or the like. The second Bluetooth device 302B may send the message to the Bluetooth headset 304, at 410. The message may be sent over the Bluetooth connection between the second Bluetooth device 302B and the Bluetooth headset 304.

Responsive to receiving the message, the Bluetooth headset 304 may (i) release the Bluetooth connection with the second Bluetooth device 302B, at 412, and then (ii) establish a Bluetooth connection with the user's Bluetooth device 302A, at 414. At 416, the Bluetooth headset 304 has a Bluetooth connection with the user's Bluetooth device 302A. Responsive to establishment of the Bluetooth connection, the user's Bluetooth device 302A may indicate the new connection status, at 418.

The user's Bluetooth device 302A may then update the connection status on the server 306, for example by sending a status update message, at 420. Other Bluetooth devices such as the second Bluetooth device 302B may obtain the status update from the server 306, at 420. The server 306 may notify the Bluetooth devices 302 of the status change.

In one embodiment a user of a Bluetooth device may "push" a Bluetooth headset connection to a second Bluetooth device. FIGS. 5A and 5B illustrate this embodiment. Referring to FIG. 5A, a user of a Bluetooth device 502A has a Bluetooth connection with Bluetooth headset 504 but would like to release that connection and instead connect the Bluetooth headset 504 to a second Bluetooth device 502B. At the end of the process, the Bluetooth headset 504 is not connected to the user's Bluetooth device 502A and is connected to the second Bluetooth device 502B, as shown in FIG. 5B. The Bluetooth devices 502 and Bluetooth headset 504 may be implemented as shown in, and described with reference to, FIGS. 1 and 2. FIG. 6 is a flow diagram illustrating this process 600.

Referring to FIG. 6, at the start of the process 600, the Bluetooth headset 504 has a Bluetooth connection with the user's Bluetooth device 502A but has no Bluetooth connection with the second Bluetooth device 502B, at 602. The user's Bluetooth device 502A may indicate this status. For example, the status may be kept by a server 506, and may be updated by the Bluetooth devices 502.

The user may initiate the connection push process by providing user input to the user's Bluetooth device 502A, at 604. For example, the user may employ an app executed by the user's Bluetooth device 502A that implements the functionality described herein. In one embodiment the user drags an icon representing the Bluetooth headset 504 away from an icon representing the user's Bluetooth device 502A and toward an icon representing the second Bluetooth device 502B. Alternatively, the process may be initiated automatically based on user settings, system states such as whether the headset 504 is in a call, and the like.

Responsive to the user input, the user's Bluetooth device 502A may send a message to the Bluetooth headset, at 606. The message may represent a command for the Bluetooth headset 504 to establish a Bluetooth connection with the second Bluetooth device 502B. The message may include the Bluetooth Device Address of the second Bluetooth device 502B or some other unique device identification tag or number. The user's Bluetooth device 502A may have obtained the Bluetooth Device Address of the second Bluetooth device 502B from the server 506. The message may be sent over the Bluetooth connection between the user's Bluetooth device 502A and the Bluetooth headset 504.

Responsive to receiving the message, the Bluetooth headset 504 may (i) release the Bluetooth connection with the user's Bluetooth device 502A, at 608, and then (ii) establish a Bluetooth connection with the second Bluetooth device 502B, at 610. At 612, the Bluetooth headset 504 has a Bluetooth connection with the second Bluetooth device 502B.

The second Bluetooth device 502B may then update the connection status on the server 506, for example by sending a status update message, at 614. Communications between the Bluetooth devices 502 and the server 506 may be by network connections such as Wi-Fi or the like. Other Bluetooth devices such as the user's Bluetooth device 502A may obtain the status update from the server 506, at 616. The server 506 may notify the Bluetooth devices 502 of the status change. Responsive to the status change, the user's Bluetooth device 502A may indicate the new connection status, at 618.

In one embodiment a user of a Bluetooth device may "transfer" a Bluetooth headset connection from a second Bluetooth device to a third Bluetooth device. FIGS. 7A and 7B illustrate this embodiment. Referring to FIG. 7A, a user of a Bluetooth device 702A that is not connected to a Bluetooth headset 704 would like to (i) release a Bluetooth connection between the Bluetooth headset 704 and a second Bluetooth device 702B and (ii) establish a Bluetooth connection between the Bluetooth headset 704 and a third Bluetooth device 702C. At the end of the process, the Bluetooth headset 704 is connected to the third Bluetooth device 702C but is connected neither to the user's Bluetooth device 702A nor to the second Bluetooth device 702B, as shown in FIG. 7B. The Bluetooth devices 702 and Bluetooth headset 704 may be implemented as shown in, and described with reference to, FIGS. 1 and 2. FIG. 8 is a flow diagram illustrating this process 800.

Referring to FIG. 8, at the start of the process 800, the Bluetooth headset 704 has no Bluetooth connection with the user's Bluetooth device 702A or with the third Bluetooth device 702C but has a Bluetooth connection with the second Bluetooth device 702B, at 802. The user's Bluetooth device 702A may indicate this status. For example, the status may be kept by a server 706, and may be updated by the Bluetooth devices 702.

The user may initiate the connection transfer process by providing user input to the user's Bluetooth device 702A, at 804. For example, the user may employ an app executed by the user's Bluetooth device 702A that implements the functionality described herein. In one embodiment the user drags an icon representing the Bluetooth headset 704 away from an icon representing the second Bluetooth device 702B and toward an icon representing the third Bluetooth device 702C. Alternatively, the process may be initiated automatically based on user settings, system states such as whether the headset 704 is in a call, and the like.

Responsive to the user input, the user's Bluetooth device 702A may send a message to the server 706, at 806. The message may represent a command for the Bluetooth headset 704 to establish a Bluetooth connection with the third Bluetooth device 702C. The message may include the Bluetooth Device Address of the third Bluetooth device 502C or some other unique device identification tag or number. The user's Bluetooth device 502A may have obtained the Bluetooth Device Address of the third Bluetooth device 502C from the server 506. The server 706 may send the message to the second Bluetooth device 702B, at 808. Communications between the Bluetooth devices 702 and the server 706 may be by network connections such as Wi-Fi or the like. The second Bluetooth device 702B may send the message to the Bluetooth headset 704, at 810. The message may be sent over the Bluetooth connection between the second Bluetooth device 702B and the Bluetooth headset 704.

Responsive to receiving the message, the Bluetooth headset 704 may (i) release the Bluetooth connection with the second Bluetooth device 702B, at 812, and then (ii) establish a Bluetooth connection with the third Bluetooth device 702C, at 814. At 816, the Bluetooth headset 704 has a Bluetooth connection with the third Bluetooth device 702C.

The third Bluetooth device 702C may then update the connection status on the server 706, for example by sending a status update message, at 818. Other Bluetooth devices such as the user's Bluetooth device 702A and the second Bluetooth device 702B may obtain the status update from the server 706, at 820. The server 706 may notify the Bluetooth devices 702 of the status change. Responsive to the status change, the user's Bluetooth device 704A may indicate the new connection status, at 822.

In the embodiments described herein, it is the Bluetooth headset 304, 504, 704 that disconnects and establishes Bluetooth connections. But in other embodiments it is the Bluetooth devices 302, 502, 702 that disconnect and establish Bluetooth connections. The establishment and disconnection of Bluetooth connections may be made in a conventional manner.

In the described embodiments the Bluetooth Device Addresses of other Bluetooth devices 302B, 502B, 702B, 702C are stored on the user's Bluetooth device 302A, 502A, 702A and included in the messages sent by the user's Bluetooth device 302A, 502A, 702A. But in other embodiments the Bluetooth Device Addresses of other Bluetooth devices 302B, 502B, 702B, 702C are stored in the servers 306, 506, 706. In such embodiments, the messages sent by the user's Bluetooth device 302A, 502A, 702A include identifiers of the other Bluetooth devices 302B, 502B, 702B, 702C and the servers 306, 506, 706 add the Bluetooth Device Addresses to the messages based on those identifiers.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. For example the status of the headset could be advertised over the server to the Bluetooth devices. The status could include the headset's battery status, activity status, or the like. The activity status could indicate whether the headset is in a call, playing music, and the like. As another example, the headset could report diagnostics over the server so that all the Bluetooth devices can show on screen whether a headset is broken. In another example the headsets include sensors like accelerometers and gyroscopes, and so can advertise status such as whether the headset is currently being worn or is just lying around. In another example the last-known location of the headset may be advertised to support a "find my headset" feature where the location may be reported to the Bluetooth devices using a map. Accordingly, other implementations are within the scope of the following claims.

What is claimed is:

1. Non-transitory computer-readable media embodying instructions executable by a processor in a first Bluetooth device to perform functions comprising:
   indicating, upon a user interface of the first Bluetooth device, a connection status of the first Bluetooth device, a second Bluetooth device, a third Bluetooth device, and a Bluetooth headset, wherein the connection status indicates that (i) the first Bluetooth device has no Bluetooth connection with the Bluetooth headset, (ii) the second Bluetooth device has a first Bluetooth connection with the Bluetooth headset, and (iii) the third Bluetooth device has no Bluetooth connection with the Bluetooth headset;
   receiving, from the user interface of the first Bluetooth device, a user input to establish a second Bluetooth connection between the third Bluetooth device and the Bluetooth headset; and
   sending a message from the first Bluetooth device to the second Bluetooth device responsive to receiving the user input, wherein the message represents a command for the Bluetooth headset to establish the second connection with the third Bluetooth device;
   wherein the second Bluetooth device sends the message to the Bluetooth headset; and
   wherein the Bluetooth headset, responsive to receiving the message, (i) releases the first Bluetooth connection with the second Bluetooth device and then (ii) establishes the second Bluetooth connection with the third Bluetooth device.

2. The non-transitory computer-readable media of claim 1, wherein sending the message to the second Bluetooth device comprises:
   sending the message to a server, wherein the server sends the message to the second Bluetooth device.

3. The non-transitory computer-readable media of claim 1, wherein the functions further comprise:
   receiving a status message responsive to the third Bluetooth device having the second Bluetooth connection with the Bluetooth headset, wherein the status message indicates that the third Bluetooth device has the second Bluetooth connection with the Bluetooth headset.

4. The non-transitory computer-readable media of claim 3, wherein the functions further comprise:
   updating a user interface of the first Bluetooth device to indicate that (i) the first Bluetooth device has no Bluetooth connection with the Bluetooth headset, (ii) the second Bluetooth device has no Bluetooth connection with the Bluetooth headset and (iii) the third Bluetooth device has the second Bluetooth connection with the Bluetooth headset responsive to receiving the status message.

5. The non-transitory computer-readable media of claim 1:
   wherein the message includes a unique identifier of the third Bluetooth device.

6. The non-transitory computer-readable media of claim 5:
   wherein the unique identifier of the third Bluetooth device includes a Bluetooth Device Address of the third Bluetooth device.

* * * * *